Sept. 1, 1970 J. R. BENNETT ET AL 3,526,878

DIGITAL COMPUTER SYSTEM

Filed March 27, 1967 2 Sheets-Sheet 1

United States Patent Office 3,526,878
Patented Sept. 1, 1970

3,526,878

DIGITAL COMPUTER SYSTEM

James Russell Bennett and Roger E. Packard, Glendora, Calif., assignors to Burroughs Corporation, Detroit, Mich., a corporation of Michigan Filed Mar. 27, 1967, Ser. No. 626,176
Int. Cl. G06f 3/04
U.S. Cl. 340—172.5 12 Claims

ABSTRACT OF THE DISCLOSURE

A computer system in which the main memory of the computer is time-shared by one or more processing units and by a plurality of peripheral devices and having an address memory which contains address words used for addressing the main memory. The address memory has one section which is addressed by a multi-line input-output control unit with the selection being made on the basis of accesses to main memory requested by a plurality of peripheral devices all of which communicate with main memory over a single input-output channel. In one embodiment a scratchpad memory is provided within the multi-line control unit and is addressed in the same manner as is the one section of the address memory.

BACKGROUND OF THE INVENTION

This invention relates to digital computer systems and more particularly to such systems in which data communication lines communicate with the central control unit of the computer over a single input-output channel.

Computer systems in which the main memory of the computer is time-shared by one or more processing units and by a plurality of peripheral devices have become well known in recent years. In such systems, the central control unit allocates requests for accesses to the main memory made by processors and by the peripheral devices. By operating in such a manner, many processing and input-output operations may be executed simultaneously. Consequently, many users may operate the computer simultaneously, or apparently simultaneously, in such a way that each is or may be completely unaware of the use being made of the computer by others. Additionally, a number of programs may be executed such that none needs to be completed before another is started or continued. Where several independent processors are utilized in the system, each may have access to a common main memory of the system.

In the systems described in the preceding paragraph, the central control unit of the system allocates accesses to main memory which are requested by the various devices. A device having access to the memory during any given memory cycle need not, and probably will not, have access to the memory during the immediately succeeding memory cycle. Thus, during successive memory cycles, the memory may be utilized in conjunction with entirely unrelated operations. The device which receives access to memory at any given time is determined on the basis of decisions made by the central control unit which thereby achieves optimum usage of the main memory and assures that all simultaneously performed operations will be executed insofar as possible on a basis such that each of the operations is unaware that others are also being executed.

Transmission of data over long distances via commercially available transmission lines has long been known. Such transmissions may occur, for example, over the Bell System telephone network, over the TWX network, the Telex network, or over leased lines. Recently, the transmission of data over such data communication lines has been made directly communicable with computer systems. Thus, a computer system may transmit data via data communication lines directly to, or receive data from, a terminal unit which may be several thousand miles away.

The various input-output units utilized in a computer system having a time-shared main memory ordinarily communicate with the central control unit of the system via a plurality of input-output control units and a plurality of input-output channels. Each input-output unit will often have an individual control unit and an individual input-output channel associated with it. When a large number of data communication lines must communicate with the central control unit, it is often uneconomic to provide an individual control unit and input-output channel for each line. Since the transmission of data over the communication lines is relatively slow, it is possible to provide a single multi-line input-output control unit for all of the data communication lines. Data transmitted over all of the lines is thereby funnelled into a single input-output channel between the multi-line control unit and the central control unit. Since data will ordinarily be transmitted over the data communication lines a bit at a time and over the single input-output channel a character at a time, temporary storage means must be provided within the multi-line control unit. The storage means must provide a word location for each of the data communication lines and the length of each word location must be sufficient to store not only an entire character but also bits manifesting an instruction and various control bits. The cost of using flip-flop circuitry to provide the storage facilities for all of the data communication lines would be prohibitive. One advantage of the present invention is that only a single such "hard" storage register, having a capacity of one such word, is required.

The addresses in main memory into which data received from peripheral input-output units are stored are often determined in part by the particular input-output channel through which the data were transmitted to the central control unit. No problem of identifying the source of the data arises when a particular input-output channel transmits data from only a single input-output unit. Where a single input-output channel transmits data received from a large number of data communication lines, however, such a source identification problem does arise. One solution is to "tag" each character transmitted over the data communication lines with bits identifying the particular line over which a character was transmitted. Thus, although characters from all of the data lines will be stored in an intermixed manner within the same area of main memory, all of the characters will bear tags indicating their respective data line. Programmatic methods may then be subsequently utilized to remove from this area in memory those characters bearing common "tags" and to restore each such group of characters in separate areas in memory reserved for data from each of the data communication lines. Such techniques are, however, both time consuming and wasteful of program space.

An advantage of the present invention is that it enables such characters to be stored immediately in a section of main memory reserved for the particular data line over which each character was transmitted.

Another advantage of the present invention is that characters need not be "tagged" to identify their respective data communication lines.

A further advantage of the present invention is that programmatic techniques are not necessary to remove characters transmitted via data communication lines from a common area in memory to memory areas reserved for each such line.

An additional advantage of the present invention is that data characters transmitted over a plurality of data communication lines but received over a single input-output channel are stored in areas of main memory determined by the data communication lines rather than by the input-output channel.

Another advantage of the present invention is that it provides an improved time-shared computer system in which a plurality of data communication lines communicate with the system over one or more input-output channels common to all of the lines.

SUMMARY OF THE INVENTION

In brief, the preceding and additional advantages are achieved by means of an address memory which contains address words used for addressing the main memory and which is divided into two sections. One section of the address memory is itself addressed by the central control unit with the selection being made on the basis of accesses to main memory made by the input-output channels. The other section of the address memory is itself addressed by a multi-line input-output control unit with the selection being made on the basis of accesses to main memory requested by line adapters associated with respective ones of a plurality of data communication lines. Thus, by means of an address memory having two sections, address words may be stored in locations of the address memory which are reserved for respective ones of a plurality of data communication lines which utilize a common input-output channel to the central control unit. A scanning means within the multi-line input-output control unit scans both the other section of the address memory and a scratchpad memory within the control unit itself. The scratchpad memory may advantageously be identical in construction to the address memory and provides, in word locations reserved for each of the data communication lines, temporary storage for data bits, instruction bits and control bits associated with particular ones of the lines.

BRIEF DESCRIPTION OF THE DRAWING

The manner of operation of the present invention and the manner in which it achieves the above and other advantages may be more clearly understood by reference to the following detailed description when considered with the drawing in which.

DETAILED DESCRIPTION

Figure 1:
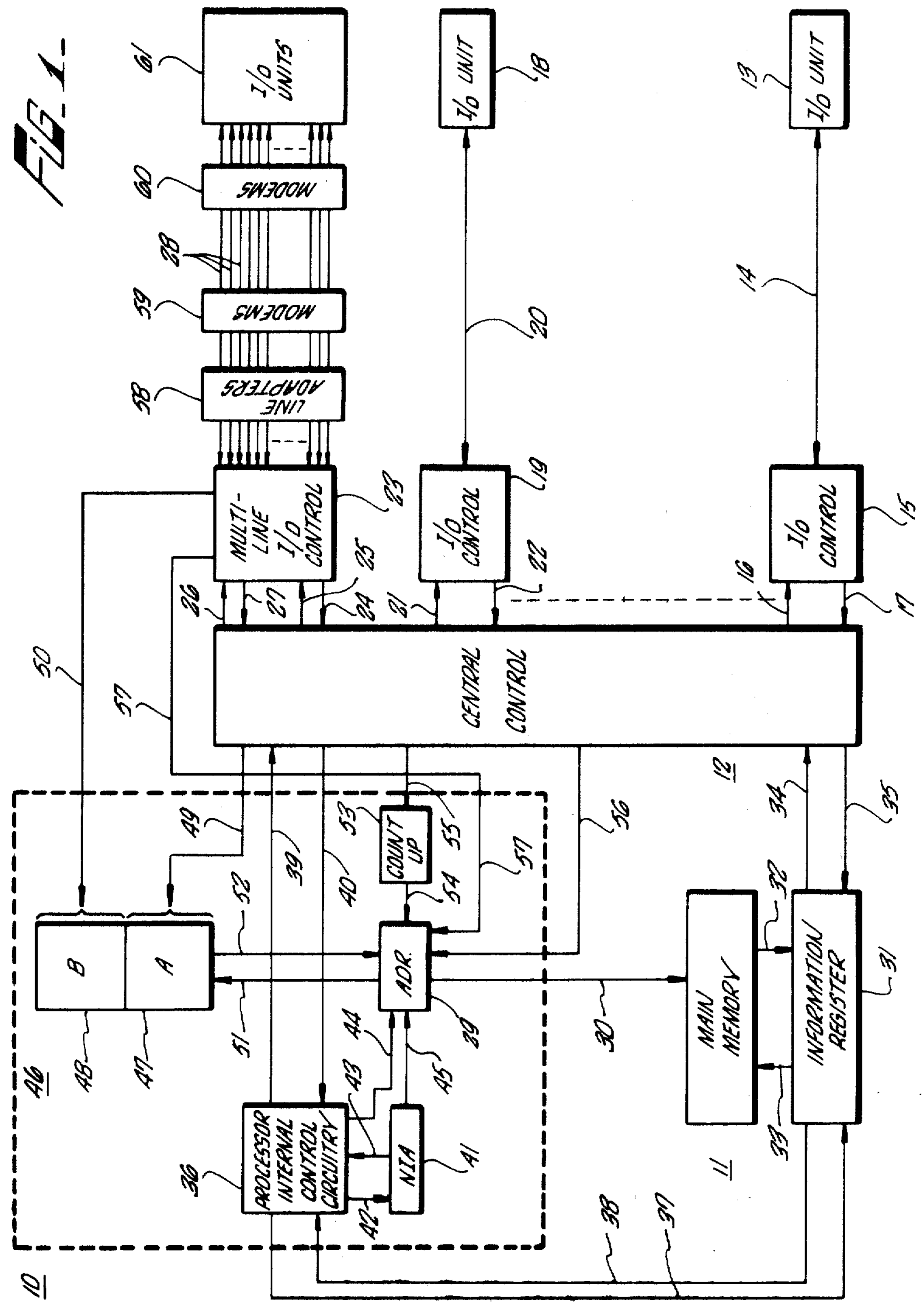
FIG. 1 depicts a block diagram of a computer system which incorporates the present invention.

FIG. 1 depicts a computer system which incorporates the present invention. It depicts central processing unit 10, main memory 11, and central control unit 12. Main memory 11 is time-shared by processor 10 and a plurality of input-output units. Access to memory 11 by the processor and the input-output units is controlled by the central control unit 12. Consequently, a plurality of input-output operations may proceed simultaneously, and many users may thereby utilize the system simultaneously in such a way that each can be completely unaware of the use of the system being made by others. Whenever the processor or any of the input-output units desire access to memory 11, they indicate this desire by transmitting a signal to central control unit 12. The central control unit 12 then handles these requests for memory access, and allocates memory accesses to the processor and the input-output units. Control unit 12 has a fixed number of input-output channels, each of which is reserved for a single input-output control unit. The unit 12 is considered, for purposes of description herein, to have twenty such input-output channels. Input-output unit 13 is connected to a first input-output channel of control unit 12 via line 14 and input-output control unit 15. The first input-output channel is indicated by lines 16 and 17. Although lines 16 and 17 are shown in FIG. 1 as single lines for the purpose of clarity, as are other lines depicted in the drawing, in actuality many lines will be utilized to transmit signals over the indicated paths. Input-output unit 18 is shown connected to the eighteenth input-output channel by input-output control unit 19 and lines 20, 21, and 22.

Some input-output units which must communicate with central control 12 are much slower than others with respect to their speed of operation. The allocation of a separate input-output channel to central control unit 12 for each such slow speed unit would be uneconomic. In recent years communication lines have been utilized to transmit data between a computer system and input-output units which may be several thousand miles away. Transmission of data between a computer system and such distant units may be over data communication lines of various types such as the telephone network, the TWX network, the Telex network or over leased lines. Transmission of data over such data communication lines is relatively slow compared to the rate of transmission between a computer system and input-output units connected directly thereto. In FIG. 1 a multi-line input-output control unit 23 is utilized to connect a plurality of such data communication lines to central control unit 12 by means of only two input-output channels. These two input-output channels, the nineteenth and twentieth of control unit 12, are indicated by the lines 24 and 25 and by the lines 26 and 27, respectively.

For the purpose of description herein, the multi-line control unit 23 will be considered to be connected to thirty-six input-output units via data communication lines 28. The nineteenth input-output channel is utilized to transmit commands between control unit 12 and multi-line control unit 23, while the twentieth input-output channel is utilized to transmit data between these control units. Data transmitted between the computer system and the thirty-six input-output units connected to multi-line control unit 23 via the data communication lines 28 is thus funnelled to a single input-output channel connecting control units 23 and 12. As a result, the total number of input-output units which may be serviced by central control unit 12 has been increased from 20 to 54.

Within the central processing unit 10 is address register 29. Address register 29 is utilized to address main memory 11 via line 30. Information is read from memory 11 to information register 31 via line 32, and is written into memory 11 from register 31 via line 33. Register 31 is connected to central control unit 12 via lines 34 and 35, and to control circuitry 36 within processor 10 via lines 37 and 38. Control circuitry 36 is connected to central control unit 12 via lines 39 and 40, to next instruction address register 41 within processor 10 by lines 42 and 43, and to address register 29 via line 44. Register 41 contains the address of the next instruction of a stored program being executed by processor 10. Register 41 is connected to address register 29 via line 45. Also within processor 10 is address memory 46. Address memory 46 comprises a section 47 and a section 48 which will hereafter sometimes be referred to as the "A" and "B" sections, respectively, of the address memory 46. Address memory 46 may advantageously be made up of a number of cards containing integrated transistor storage devices. Such cards are described, for example, in the copending application of Edwin S. Lee, III, Ser. No. 278,021, filed on May 6, 1963, now U.S. Pat. 3,418,639, and assigned to the assignee of the present application. Although address memory 46 is made up of such integrated circuitry, it operates in the manner of a word-organized core memory.

Section "A" of address memory 46 is addressed via line 49 by central control unit 12 only. Section "A" of address memory 46 has two word locations reserved therein for each of the twenty input-output channels which connect control unit 12 to the input-output units and additional word locations reserved for use by the processor itself. Section "B" of address memory 46 is addressed via line 50 by the multi-line control unit 23 only. Section "B" has two word locations reserved therein for each of the thirty-six input-output units serviced by multi-line control unit 23. Address register 29 serves as an information register for address memory 46 as well as an address register for memory 11. Addresses in main memory 11 are written into address memory 46 from register 29 via line 51 and are read from memory 46 into register 29 via line 52. The storing of addresses in a memory and transferring these addresses to the address register of the main memory is described in more detail in U.S. Pat. 3,359,544.

When information is written into or read from memory 11 during any given memory cycle, the contents of address register 29 will ordinarily be counted up by circuitry 53 via line 54 prior to the next succeeding memory cycle. The counting up operation is under the control of central control unit 12 via line 55 connecting control unit 12 and count-up circuitry 53. For purposes of description herein memory 11 will be assumed to store individually addressable four-bit digits. It will further be assumed, however, that these digits will ordinarily be written into and read from memory 11 two digits at a time. Thus, during each memory cycle, count-up circuitry 53 will ordinarily increase the contents of address register 29 by two.

During the operation of the system shown in FIG. 1, input-output commands are transferred two digits at a time to the input-output control unit of the input-output unit to which they relate and to reserved locations within address memory 46. After such a command has been received in full, a channel descriptor word is stored in memory 11 at a predetermined location therein, thereby designating that the complete command has been received. The address at which this descriptor word is to be stored is set into register 29 by central control unit 12 via line 56. When the input-output command relates to one of the input-output units associated with the multi-line control unit 23, the channel descriptor word stored in memory 11 via line 56 and the nineteenth input-output channel indicates that the nineteenth channel is again free to receive an input-output command directed to a different one of the input-output units associated with multi-line control unit 23. When the particular input-output command has been executed by the multi-line control unit 23, a second descriptor word is stored in memory 11 from multi-line control unit 23 via line 57 connected between control unit 23 and address register 29. The freeing of the nineteenth input-output channel after an input-output command has been fully received, even though the command has not yet been executed, enables the nineteenth input-output channel to receive a second input-output command while the first is being executed by control unit 23. Similarly, additional input-output commands relating to other ones of the input-output units associated with control unit 23 may be received via the nineteenth input-output channel while several previously received commands are in the process of being executed by control unit 23. Thus, commands related to different ones of the input-output units associated with control unit 23 may be simultaneously executed by control unit 23.

With respect to the block diagram shown in FIG. 1, line adapters 58 are shown connected between multi-line input-output control unit 23 and the data communication lines 28. There will be a separate line adapter for each of the data communication lines, although for the sake of illustration they are shown in FIG. 1 as a single block. Additionally, two modulator-demodulators (hereinafter modems) 59 and 60 will be utilized in conjunction with each of the data communication lines. The modems, also shown as single blocks, are stationed at opposite ends of each of the data communication lines. One modem modulates the digital data prior to its transmission over the data communication line, while the other modem demodulates the modulated signals received over the data communication line. Such modems are available, for example, through the American Telephone and Telegraph Company. Thus, with respect to each input-output unit 61 connected to multi-line input-output control unit 23, there will be a line adapter 58 adjacent the unit 23, a first modem 59 adjacent the line adapter 58, a second modem 60 adjacent the input-output unit, and a data communication line joining the two modems. First modems 59 are shown adjacent the line adapter 58. The data communication lines 28 join these modems with second modems 60 which, in turn, are connected to input-output units 61. Although the system shown in FIG. 1 would have thirty-six separate line adapters 58, thirty-six separate modems 59, thirty-six separate modems 60, and thirty-six separate input-output units 61, each of these groups of components is shown as a single block on FIG. 1 for purposes of illustration.

The line adapters 58 enable input-output units of different type to be connected to the same input-output control unit. These line adapters provide a common interface between each of the input-output units 61 and the multi-line control unit 23. Additionally, they change the electrical and logical levels of signals provided by the modems 59 and transform these signals into signals which are compatible with multi-line control unit 23. They also provide a timing function whereby they accommodate different clock rates required by the input-output units to the multi-line control unit 23. Furthermore, they provide bit handling circuitry and control circuitry whereby a bit may be temporarily stored and, additionally, provide logic circuitry for controlling the modems 59. Line adapters of this type as well-known and have been designed to operate with various different types of input-output units. Suitable line adapters are described, for example, in U.S. Pat. 3,390,379.

During the operation of the system depicted in FIG. 1, the central control unit 12 allocates accesses to main memory 11 requested by the processor, by the eighteen input-output units associated with the first eighteen input-output channels, and by the thirty-six input-output units associated with the nineteenth and twentieth input-output channels via multi-line control unit 23. All of these fifty-five devices may be operating simultaneously such that each is virtually unaware of the fact that memory 11 is also being addressed by the other devices. Thus, while only one of the devices will have access to memory 11 during any given memory cycle, any of the other devices may be allocated access to the memory during the immediately succeeding memory cycle. It is the central control unit 12 which determines which of the devices has access to memory 11 during any given memory cycle. Assume, for example, that the processor wishes to execute the next command in a program which it is in the midst of executing. The address of this next command is stored in next instruction address register 41. This address is transferred to address register 29 via line 45. During a first memory cycle granted to the processor the first two digits of the command are read out of memory 11 into information register 31 and thence transferred via line 38 to processor control circuitry 36. At the end of this memory cycle the contents of register 29 are counted up by two by the counting circuitry 53 and the new contents of address register 29 are stored in the first of two word locations in section "A" of address memory 46 which are reserved for addresses associated with the processor. By having granted memory access to the processor during the memory cycle just discussed, the central control unit 12 automatically addressed the word location in address memory 46 reserved for the processor. Thus, at the end of the memory cycle granted to the processor, the address of the next section of the command which the processor desires to execute has been stored in that location in section "A" of address memory 46 which is reserved for the processor. When the processor is next granted access to memory 11, the address of the next section of the processor command is read from section "A" of address memory 46 into address register 29. The next two digits of the command are subsequently read from memory 11 into register 31 and transferred to processor control circuitry 36, the contents of register 29 are counted up by two, and the new address in register 29 is then returned to the location in section "A" of address memory 46 reserved for the processor. This procedure continues until the entire command has been read from memory 11 and transferred to processor control circuitry 36. The command may be assembled in registers within circuitry 36 or, alternatively, may be assembled under the control of central control unit 12 within additional word locations in section "A" of address memory 46 which are reserved for use by the processor.

The processor next commences to execute the particular command. Whenever, during execution of the command, the processor needs to read data from memory 11, the initial address of the data word to be read is inserted into an address register 29 via lead 44 and the data word is read out of memory 11, two digits at a time, during each of the memory cycles allocated to the processor. The read out of a data word proceeds in a manner identical to the read out of an instruction word. Processor requests for memory access may be transmitted to central control 12 via line 39, while grants of access to the processor may be transmitted to processor control circuitry 36 via line 40.

Requests for memory access by the input-output units proceed in a manner similar to that described for the processor. Thus, for example, if input-output unit 13 requests a memory access, this request will be transmitted via input-output control unit 15 and line 17 of the first input-output channel to central control unit 12. When memory access is granted to this input-output unit by central control unit 12, the central control unit 12 automatically addresses that location of section "A" of address memory 46 which is reserved for the first input-output channel. Consequently, when input-output control unit 15 is in the midst of transferring data between input-output unit 13 and memory 11, this data will be trasnferred via register 31 and lines 34 and 35 into or from the addresses in memory 11 specified by the contents of a word location in section "A" of memory 46 reserved for the first input-output channel. Time-sharing of a computer main memory 11 between a processor and input-output units such as units 13 and 18 by means of central control unit 12 and input-output control units 15 and 19 is well-known and will not be described at length herein. Such a modular computer system is described, for example, in U.S. Pat. 3,200,380.

The extension of such time-sharing to input-output units controlled by a single multi-line control unit has heretofore presented certain difficulties, however, which are eliminated by the present invention. These problems are eliminated by the use of section "B" of address memory 46. Section "B" of address memory 46 is not addressed by central control unit 12 as is section "A," but, rather is addressed solely by the multi-line control unit 23 itself. Section "A" of address memory 46 has only two word locations reserved therein for the twentieth input-output channel. The twentieth input-output channel, however, receives data from and transmits data to thirty-six different input-output units. Without the use of section "B" of address memory 46 there will be only one area in memory 11 wherein data received from all thirty-six input-output units will be stored. Data from these thirty-six units would then be completely intermixed within this memory area.

Assume, for example, that one of the thirty-six input-output units is ready to transmit an information character to memory 11 and that no section "B" of address memory 46 were available. When memory access is granted by central control unit 12, this character would be stored in an address specified by a word in the location in section "A" of memory 46 reserved for the twentieth input-output channel and, subsequent to the storage of this character, the address stored in this reserved location would be increased by two. If the next memory access granted to the twentieth input-output channel were not for the same one of the thirty-six input-output units, but, rather were for a different one of these units, the character received from this second input-output unit would, nevertheless, be stored in the location in memory 11 immediately succeeding the location in which a character from a different one of the input-output units was previously stored. Consequently, every character received from the input-output units would have to be somehow "tagged" in order to indicate which of the thirty-six data communication lines it came from. In prior systems it has been necessary to utilize software in order subsequently to separate the blocks of information received from the input-output lines via a single input-output channel and stored in a single area within memory 11. Thus, it has been necessary programmatically to segregate these blocks of data subsequent to their reception via the data communication lines. Two prior art ways of doing this are as follows. A first possibility is to use the software to scan all of the memory locations associated with the input-output channel of the multi-line control unit, to separate out all of the characters tagged as having been received from a particular line, and to store these characters in a particular memory area reserved for this particular line. Another procedure is to scan all of the memory locations associated with the input-output channel of the multi-line control unit, to recognize the data communication line from which each character was received, and then to store each character as it is scanned in a section of the memory reserved for information from its particular data communication line. Such procedures are both time-consuming and wasteful of program space.

The problem is solved in the present invention by means of utilizing a second section of the address memory 46 which is reserved exclusively for the data communication lines. This second section 48 is addressed solely by multi-line input-output control 23 via line 50. When a particular one of the input-output units 61 desires access to memory 11, this request is transmitted via the multi-line input-output control 23 and the twentieth input-output channel to the central control unit 12. When memory access for this request is granted by control unit 12, the data character is transferred between the particular one of the input-output units 61 and a predetermined address in the main memory 11 reserved for this particular one of the input-output units 61 via information register 31. The predetermined address within memory 11 is selected by means of an address word stored in a location within section "B" of address memory 46 which is reserved for the particular one of the input-output units 61 which has requested access. This reserved location within section "B" of address memory 46 is itself addressed by means of line 50 from multi-line input-output control 23. For example, if the thirtieth one of the input-output units 61 is in the process of transmitting information characters to particular locations in memory 11, and a character from this thirtieth input-output unit is received by multi-line control 23, central control unit 12 will be requested to grant an access to memory 11. When this request is granted, multi-line control unit 23 will address, via line 50, a word in section "B" of address memory 46 which is reserved for the thirtieth unit 61 and this word will be read out into address register 29. The character received from the thirtieth input-output unit will be transmitted via the twentieth input-output channel and information register 31 into the address in memory 11 specified by the word now stored in address register 29. The contents of address register 29 will then be counted up by two by circuitry 53 and will be returned to the location in section "B" of address memory 46 which is reserved for the thirtieth input-output unit 61. Subsequently, many of the other devices which can obtain access to memory 11 may be granted access by control unit 12 to the memory. When the next data character is received from the thirtieth input-output unit 61, however, another request for memory access will be made and, when granted, this character will be stored in the address in memory 11 now specified in the location in section "B" of address memory 46 which is reserved for the thirtieth input-output unit 61. As a result, successive characters received from the thirtieth input-output unit 61 will be stored in adjacent locations within memory 11, despite the fact that many other characters from other ones of the input-output units 61 may have been received intermediate the two characters from the thirtieth input-output unit 61. As a result, it may be seen that, despite the fact that a plurality of input-output units communicate with main memory 11 over a single input-output channel, characters from individual ones of these input-output units may, nevertheless, be stored in locations in memory 11 allocated to their particular ones of the input-output units 61. Consequently, when an indication is received by multi-line control unit 23 that a complete block of information has been received from a particular one of the input-output units 61, there is no need for subsequent programmatic operations to recognize and segregate those characters which have been received from the particular one of the input-output units 61. Rather, the indication from one of the input-output units 61 that it has transmitted a complete block of information indicates, when the present invention is utilized, that the block of information received can be immediately used.

Figures 2, 3, 4:
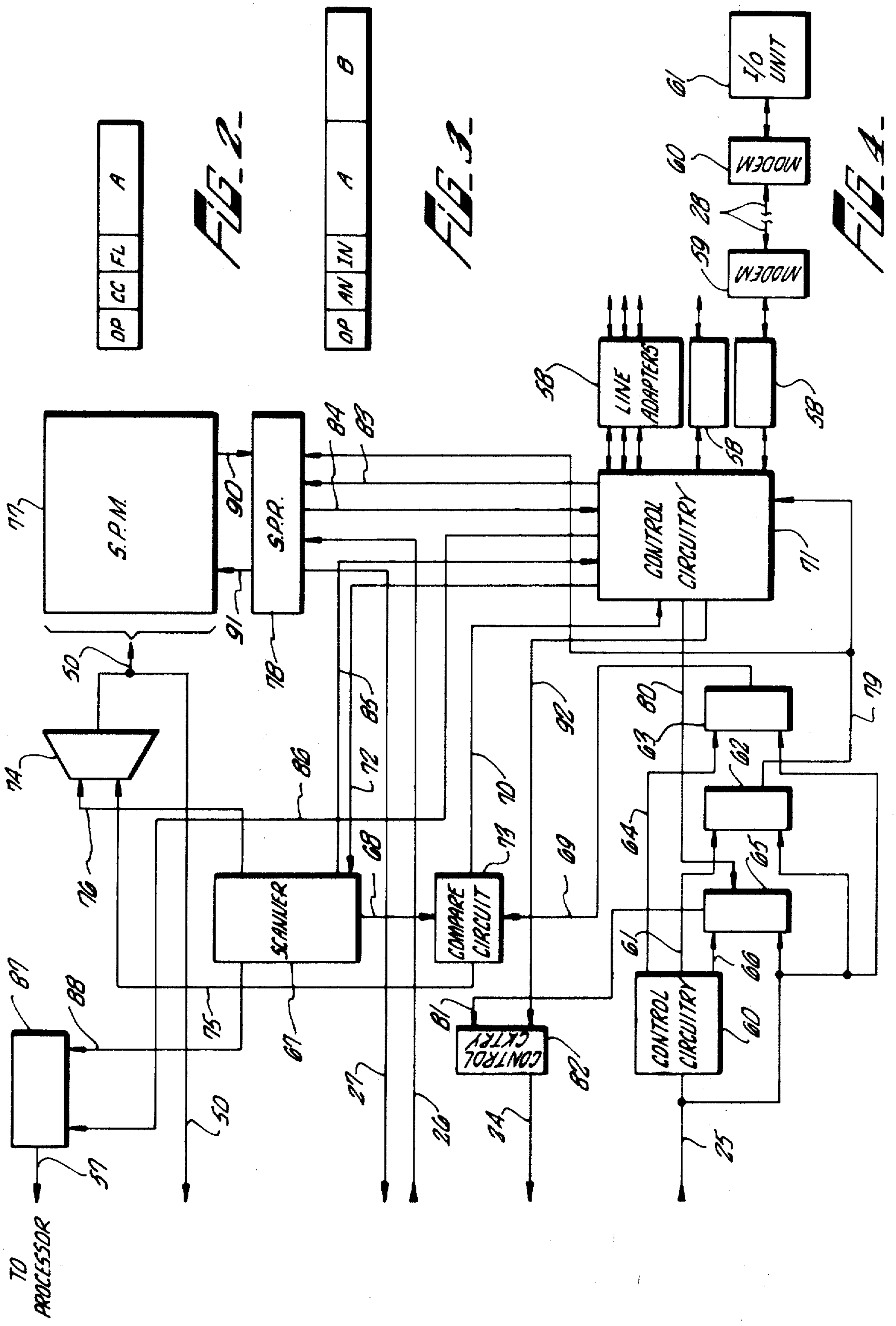
FIGS. 2 and 3 depict illustrative commands which may be executed by the system shown in FIG. 1.
FIG. 4 depicts in greater detail the multi-line input-output control unit shown in FIG. 1.

FIGS. 2 and 3 depict exemplary commands which may be utilized in the computer system of FIG. 1 and FIG. 4 depicts in greater detail the multi-line control unit 23 of FIG. 1. Elements common to both FIG. 1 and FIG. 4 bear the same reference characters in both figures. A particular input-output command executed by multi-line control unit 23 will now be described.

FIG. 2 depicts an "initiate input-output" command which is part of a program being executed by processor 10. The command shown in FIG. 2 is made up of two syllables, each of which comprises six digits. The first two digits, designated OP, indicate that an input-output command is to be performed. The next two digits, designated CC, indicate the particular input-output channel which is to be utilized. It will be assumed that these digits indicate that the twentieth input-output channel, which is associated with multi-line control unit 23, is to be utilized. The next two digits, designated FL, indicate the field length of the input-output command which is to be executed. It will be assumed that the field length indicated is three syllables. The second syllable of the "initiate input-output" command shown in FIG. 2 indicates the address of the input-output command which is subsequently to be executed.

Initially, the next instruction address register 41 will contain the address of the first digit of the OP digits shown in FIG. 2. This address will be transferred from next instruction address register 41 to address register 29. When a processor memory access is granted by central control unit 12, the two OP digits will be read out of memory 11 and stored in processor control circuitry 36. The address stored in register 29 will then be increased by two and stored into the location in section "A" of address memory 46 reserved for the processor. When a processor memory access is again granted, this address will be read out of the address memory, the CC digits of the command shown in FIG. 2 will be read out of memory 11 and transferred to processor control circuitry 36. Subsequently, the contents of address register 29 will again be increased by two and returned, under the control of central control unit 12, to the location in section "A" of address memory 46 which is reserved for the processor. In like manner, the two FL digits will be read from memory 11 and transfered to processor control circuitry 36 and, also in like manner, the six digits making up the "A" address of the command shown in FIG. 2 will be read out of memory 11 two digits at a time and transferred to processor control circuitry 36. At this time the "initiate input-output" command shown in FIG. 2 has been fully read out of memory 11 and stored in control circuitry 36.

Circuitry 36 then indicates to central control unit 12 via line 39 that an input-output command is to be performed and that the twentieth input-output channel is to be utilized. When the next processor memory access is granted, the word in the location in section "A" of memory 46 reserved for the processor is read into address register 29, address register 29 is cleared, and the "A" address of the command shown in FIG. 2 which is stored in control circuitry 36 is inserted into the address register 29 via line 44. Thus, at this time address register 29 contains the address of the input-output command depicted in FIG. 3. This new address is then restored into the location in section "A" of address memory 46 which is reserved for the processor.

In the operation just described, processor 10 has fetched and executed the "initiate input-output" command depicted in FIG. 2. During the fetch of this command it transferred the command from memory 11 to processor control circuitry 36. During the execution of the command it transferred to central control unit 12 via line 39 the two CC digits of the command which designate the particular input-output channel to be utilized during a succeeding input-output command. Additionally, it inserted the address "A" of the command shown in FIG. 2 which is the address of the input-output command depicted in FIG. 3, into the location in section "A" of address memory 46 which is reserved for the processor. During succeeding memory cycles which are allocated to the processor it will fetch the input-output command depicted in FIG. 3. During the first memory cycle of this fetch operation, the two OP digits are fetched from memory 11, transmitted via register 31 and line 34 to the central control unit 12, and thence transmitted via line 25 of the nineteenth input-output channel to the mutli-line control unit 23. FIG. 4 depicts a portion of the multi-line control unit 23. The two OP digits received by control unit 23 over line 25 are directed by control circuitry 60 and line 61 to register 62. During a succeeding memory cycle allocated to the processor, the next two digits of the command depicted in FIG. 3, the AN digits, are transmitted to multi-line control unit 23 and directed by control circuitry 60 and line 64 to register 63. Similarly, during the next memory cycle allocated to the processor, the next two digits, the IN digits, of the command shown in FIG. 3 will be transmitted to multi-line control unit 23 and directed to register 65 by control circuitry 60 and line 66.

At this time the processor has transferred the first syllable of the command shown in FIG. 3 to the multi-line control unit 23. During the next six memory cycles which are allocated to the processor, the "A" and "B" addresses of the command shown in FIG. 3 are transferred from memory 11 to ADR and then Section A. Processor control circuitry 36 then notifies central control unit 12 via a signal transmitted on line 39 that the fetch of the command depicted in FIG. 3 has been completed.

Next, the "A" and "B" addresses of the command in FIG. 3 are transferred via line 44 to address register 29 and subsequently stored in the two word locations in section "A" of address memory 46 which are reserved for the mutli-line control unit 23. At this time execution of the command depicted in FIG. 3 is turned over to multi-line control unit 23 and the processor is free to perform other functions. For purposes of description it will be assumed that the OP digits of the input-output command of FIG. 3 indicate that the operation to be performed is an "input" operation whereby data transmitted by a particular one of the input-output units 61 are to be written into memory 11. It will further be assumed that the AN digits of the command specify that the data is to be transmitted by the first one of the input-output units 61. The two digits of the command designated as the IN digits constitute variant digits which under certain circumstances may effect changes in either the OP or AN digits. For the purposes of the present discussion the IN digits will not be utilized. The "A" address depicted in FIG. 3 represents an address in memory 11 where the storage of the block of data to be received from the first input-output unit 61 is to be stored. The "B" address of the command depicted in FIG. 3 may represent the final address of the section of memory 11 allocated to the first input-output unit and beyond which data received from this input-output unit may not be stored. Scanner 67 depicted in FIG. 4 sequentially presents signals on thirty-six output lines 68 which are associated with the thirty-six line adapters 58. Compare circuit 73 is connected to the lines 68 and is connected to register 63 by line 69. After execution of the command of FIG. 3 has been turned over to the multi-line control unit 23, scanner 67 sequentially scans the thirty-six line adapters until it scans that adapter which is identified by the contents of register 63. At this time compare circuitry 73 recognizes that the scanner 67 is pointing at the adapter identified by the contents of register 63. When this comparison is made, a signal on line 70 from compare circuit 73 notifies control circuitry 71 that there has been a comparison and control circuitry 71, via line 72, in turn causes the scanner 67 to stop at this position.

At this time signals from compare circuit 73 and scanner 67 are applied to decoder 74 via lines 75 and 76, respectively. Decoder 74 decodes the signals on line 76 into a signal on one of thirty-six output lines 50. These lines 50 are used to address thirty-six word locations contained in scratchpad memory 77 and to address the thirty-six word locations in section "B" of address memory 46. The comparison also effects, under the control of central control unit 12, the transfer of the "A" and "B" addresses of the command in FIG. 3 from the two word locations in section "A" of address memory 46 reserved for the multi-line control unit 23, into the two word locations in section "B" of address memory 46 which are reserved for the first input-output unit 61. Scratchpad memory 77 may advantageously be identical in structure to address memory 46. The word locations in scratchpad memory 77 are related to respective ones of the thirty-six line adapters 58. The comparison detected by circuitry 73 also causes the contents of register 62, the OP digits, to be transferred via line 79 to control circuitry 71 and to scratchpad register 78. Since at any given instant in time the multi-line control unit 23 is acting upon data transmitted via only one of the line adapters 58, there need be only one "hard" storage register which is shared by all of the adapters. If, for example, a word length of forty bits of temporary storage is required for each of the thirty-six data communication lines, the scratchpad memory 77 will have a capacity of 1,440 bits while the register 78 will provide "hard" storage for forty bits. In this manner the prohibitive expense of providing 1,440 bits of "hard" storage is avoided. The scratchpad memory 77 has a word location reserved therein for each of the data communication lines. As scanner 67 stops at a particular line adapter, the word in memory 77 reserved for the particular line is read into register 78 via line 90 and written back into memory 77 via line 91 when scanner 67 resumes scanning.

Upon the reception of the OP digits into register 78, control circuitry 71 inserts a channel descriptor word in register 65 via line 80, and subsequently causes this word to be transmitted to central control unit 12 via line 24 by means of line 81 and control circuitry 82 in response to a signal applied to line 92 by control circuitry 71. Upon receiving the channel descriptor word from multi-line control unit 23 over line 24, the central control unit 12 inserts into address register 29, via line 56, an address in memory 11 reserved for channel descriptor words from multi-line control unit 23. Central control unit 12 then transmits the descriptor word received over line 24 into this address memory 11 via line 35 and register 31. Reception of this channel descriptor word indicates that the command depicted in FIG. 3 has been received by the register 78, and that the nineteenth input-output channel is now free to receive input-output commands directed to ones of the input-output units 61 associated with multi-line control 23 other than the first input-output unit 61.

At this time the command depicted in FIG. 3, has been accepted by register 78 and multi-line control unit 23 proceeds to execute the command. Lines 83 and 84 connect register 78 to control circuitry 71 and line 85 connects scanner 67 to control circuitry 71. In response to signals from scanner 67 and register 78, control circuitry 71 transmits a signal to the first one of the input-output units 61 via the line adapter 58, modem 59, data communication line 28, and modem 60 associated with this input-output unit which indicates to the selected input-output unit that it is to commence transmitting information to the system. Subsequently, the selected input-output unit 61 commences to transmit the requested data. This data is transmitted bit by bit via its data communication line to control circuitry 71 and stored in the word location in scratchpad memory 77 which is reserved for this particular input-output unit 61. After the transmission of each bit from unit 61, the scanner 67 scans all the other adapters. When a complete character of bits has been received from the first input-output unit 61 and is in register 78, control circuitry 71 recognizes that a complete character has been received and causes the character to be transmitted via line 27 to central control unit 12. The signal on line 50 from decoder 74 is now utilized to address that location in section "B" of address memory 46 which is reserved for the first input-output unit 61. Consequently, when central control unit 12 allocates a memory access to the multi-line control unit 23, the character just received from the first input-output unit 61 is stored into main memory 11 at the address designated by the "A" address of the command depicted in FIG. 3. Subsequent to this storage in memory 11, the address in register 29 is increased by two and returned to the location in section "B" of address memory 46 reserved for the first input-output unit 61. Subsequently received bits from the first input-output unit 61 are similarly stored in scratchpad memory 77 until a complete character is assembled in register 78 and then are transmitted via line 27 of the twentieth input-output channel to an address in memory 11 designated by an address word stored in the location in address memory 46 reserved for this input-output unit. When the final character of the block of data transmitted by input-output unit 61 has been received, control circuitry 71 recognizes that the transmission is complete and presents a sinnal via line 86 to descriptor address decoder 87. Line 88 connects scanner 67 with decoder 87. Decoder 87 is now utilized to insert an address in address register 29 via line 57, which address is reserved for result descriptor words associated with the first one of the input-output units 61. Control circuitry 71 then inserts such a descriptor word in register 78 and causes it then to be transmitted via line 27 to control unit 12. It then is stored in memory 11 at the address designated by the signals transmitted over line 57. This result descriptor word indicates that transmission from the first input-output unit 61 is complete, and that the command depicted in FIG. 3 has been fully executed.

The control circuit 71 in combination with each of the adapters 58 operates to transfer data between the register 78 and each of the remote input-output units. In Pat. 3,390,379 there is described in detail a suitable system for accomplishing this transfer, although much of the function of the control circuit 71 is included within the adapters described in the patent. However, the principles necessary to the design of the control circuitry required in the control circuit 71 and the adapters 58 is well known and can be readily implemented from the teaching of this patent.

Other input-output commands directed to other ones of the input-output units 61 are executed in a similar manner. Furthermore, commands related to different ones of the input-output units 61 may be executed simultaneously by the multi-line control unit 23. Although the operation of the system described above was directed to an input operation, output operations would be handled in a similar manner. For an output operation wherein a block of data is to be read from memory 11 and transmitted to a particular one of the input-output units 61, the characters of the block of data will be transmitted a character at a time via line 26 and stored in that word of scratchpad memory 77 which is reserved for the designated one of the input-output units 61. Each character received by unit 78 will then be transmitted bit by bit over the data communication line 28 associated with the selected input-output unit until execution of the command is completed.

All of the circuits shown in the accompanying drawing in block diagram form are of a type well-known to persons skilled in the art. All of the circuits designated as control circuits, for example, comprise well-known logic circuitry which may easily be designed to perform the functions specified for the circuits.

What has been described is considered to be only an illustrative embodiment of the present invention and, accordingly, it is to be understood that various and numerous other arrangements may be devised by one skilled in the art without departing from the spirit or the scope of this invention.

What is claimed is:

1. A computer system comprising:
- a main memory;
- a plurality of input-output channels communicating with the memory;
- central control means for allocating accesses to main memory by the input-output channels;
- an address memory;
- means utilizing the contents of the address memory for addressing the main memory;
- a plurality of lines for transmitting data to and receiving data from a plurality of remote stations;
- the address memory having a word location reserved therein for each of the lines; and
- multi-line control means for selectively coupling data between any one of the lines and a single one of the input-output channels and for addressing the word location in the address memory reserved for the selected line.

2. A computer system according to claim 1 further comprising:
- a plurality of input-output units; and
- a plurality of input-output control means associated with respective ones of the units for coupling the units to respective other ones of the input-output channels;
- the address memory having a word location reserved therein for each of the input-output units;
- the central control means addressing the word location reserved for one of the input-output units whenever the input-output channel associated with that unit is allocated access to main memory.

3. A computer system according to claim 2 in which the multi-line control means comprises:
- a scanning means for scanning all of the lines;
- means for halting the scanning operation of the scanning means when it is pointing at a predetermined one of the lines; and
- means responsive to the scanning means for addressing the word location in address memory reserved for the line at which the scanning means is pointed.

4. A computer system according to claim 3 in which the multi-line control means further comprises:
- a scratchpad memory having a word location reserved therein for each of the lines;
- means responsive to the scanning means for addressing the word location in the scratchpad memory reserved for the line at which the scanning means is pointed;
- an information register associated with the scratchpad memory;
- mean coupling the single one of the input-output channels to the information register; and
- control means responsive to the scanning means for coupling the line at which the scanning means is pointed to the information register.

5. A computer system comprising:
- a main memory;
- a plurality of data communication lines for transmitting data to and receiving data from a plurality of remote stations;
- a plurality of input-output units;
- a plurality of input-output channels;
- central control means for allocating accesses to main memory by the input-output channels;
- an address memory having a first and a second section, the first section having a word location reserved therein for each of the lines, the second section having a word location reserved therein for each of the input-output units;
- mean utilizing the contents of the address memory for addressing the main memory;
- input-output control means coupling each of the input-output units to an associated one of the input-output channels;
- the central control means addressing the word location in the second section of the address memory associated with a particular one of the input-output units whenever the input-output channel associated with that unit is allocated access to the main memory; and
- multi-line control means for selectively coupling predetermined ones of the data communication lines to an additional one of the input-output channels comprising:
- a scanning means for scanning all of the data communication lines;
- a scratchpad memory having a word location reserved therein for each of the data communication lines;
- means for halting the scanning operation of the scanning means when it is pointing at a predetermined one of data communication lines;
- means responsive to the scanning means for addressing the word location in the first section of the address memory reserved for the line at which the scanning means is pointed and for addressing the word location in the scratchpad memory reserved for the line at which the scanning means is pointed;
- a memory information register associated with the scratchpad memory;
- means coupling the additional one of the input-output channels to the memory information register; and
- control means responsive to the scanning means for coupling to the memory information register the data communication line at which the scanning means is pointed.

6. A computer system according to claim 5 in which a second other one of the input-output channels is coupled to the multi-line control means.

7. A computer system according to claim 6 in which the multi-line control means further comprises:
- a first register for receiving bits over the second other one of the input-output channels;
- means for coupling the first register to the halting means;
- a second register for receiving bits over the second other one of the input-output channels; and means for coupling the second register to the memory information register.

8. A computer system comprising:
a main memory;
a plurality of input-output channels communicating with the memory;
central control means for allocating accesses to main memory by the input-output channels;
an address memory;
an address register;
means for writing address words into the address memory from the address register and for reading address words from the address memory into the address register;
means utilizing the contents of the address register for addressing the main memory;
a plurality of data communication lines for transmitting data to and receiving data from a plurality of input-output units;
the address memory having a word location reserved therein for each of the lines;
multi-line control means for selectively coupling data between any one of the lines and a particular first one of the input-output channels, the multi-line control means including means for addressing the word location in the address memory reserved for the selected line; and
processor means for establishing in the address register the address in main memory of an input-output command to be executed by the multi-line control means;
the central control means transmitting at least a part of this command to the multi-line control means via a particular second one of the input-output channels, the transmitted command including bits manifesting a particular one of the data communication lines and bits manifesting a particular operation.

9. A computer system according to claim 8 in which the multi-line control unit comprises:
a scratchpad memory having a word location reserved cation lines;
a scratchpad memory having a word location reserved therein for each of the data communication lines;
a memory information register;
a first register;
a second register;
means for storing in the first register the bits of the command manifesting a particular operation and in the second register the bits of the command manifesting a particular line;
means for halting the scanning operation of the scanning means when it is pointing at the line manifested by the bits in the second register;
means responsive to the scanning means for addressing the word location in the address memory reserved for the line at which the scanning means is pointed and for addressing the word location in the scratchpad memory reserved for the line at which the scanning means is pointed;
means coupling the particular first one of the input-output channels to the memory information register; and
control means responsive to the scanning means for coupling to the memory information register the data communication line at which the scanning means is pointed.

10. A computer system according to claim 9 in which the multi-line control unit further comprises:
means for transferring the bits in the first register manifesting a particular operation to the memory information register and thence to the word location in the scratchpad memory reserved for the line at which the scanning means is pointed; and
means responsive to the transfer of the operation manifesting bits for transmitting a channel result descriptor word via the second one of the input-output channels to the central control means, the central control means causing the channel result descriptor word to be stored in a predetermined address in main memory, the channel result descriptor word indicating that the second one of the input-output channels is free to transmit another input-output command to the multi-line control means.

11. A computer system according to claim 10 in which the multi-line control unit further comprises:
means responsive to the scanning means, and a determination that an input-output command associated with a particular line has been executed, for storing a descriptor word address associated with that line in the address register;
the central control means then causing a line result descriptor word to be stored in that address in main memory, the line descriptor word indicating that the multi-line control unit is free to execute another input-output command associated with the particular line.

12. In a time-shared digital computer system having a main memory, a plurality of input-output channels communicating with the memory, a plurality of input-output units, and central control means for allocating accesses to main memory by the input-output channels, the improvement comprising:
data communication lines coupled respectively to a first plurality of the input-output units for transmitting data to and receiving data from these units;
line adapter means coupled respectively to the data communication lines and all of the adapter means coupled to a single multi-line control means;
remaining ones of the input-output units coupled respectively to a plurality of input-output control means;
the multi-line control means coupled to a first one of the input-output channels;
the input-output control means coupled respectively to other ones of the input-output channels;
an address memory having a first and a second section, the first section having a word location reserved therein for each of the input-output control means, the second section having a word location reserved therein for each of the line adapters; and
means utilizing the contents of the address register for addressing the main memory;
the multi-line control means comprising means for selectively coupling the line adapters to the first one of the input-output channels and for addressing the word location in the second section of the address memory reserved for the selected line adapter.

References Cited

UNITED STATES PATENTS

| | | | |
|---|---|---|---|
| 3,061,192 | 10/1962 | Terzian | 340—172.5 X |
| 3,390,379 | 6/1968 | Carlson et al. | 340—172.5 |
| 3,416,139 | 12/1968 | Marx | 340—172.5 |
| 3,418,638 | 12/1968 | Anderson et al. | 340—172.5 |
| 3,419,852 | 12/1968 | Marx et al. | 340—172.5 |

PAUL J. HENON, Primary Examiner
P. R. WOODS, Assistant Examiner

PO-1050
(5/69)

UNITED STATES PATENT OFFICE
CERTIFICATE OF CORRECTION

Patent No. 3,526,878 Dated September 1, 1970

Inventor(s) James Russell Bennett and Roger E. Packard

It is certified that error appears in the above-identified patent and that said Letters Patent are hereby corrected as shown below:

Column 5, Line 57- For "executed" substitute "executed";
Column 6, Line 31- For "as" substitute "are";
Column 12, Line 56- For "sinnal" substitute "signal";
Column 14, Line 50- Insert "the" before the word "data";
Column 15, Lines 39 and 49, delete "a scratchpad memory having a word location reserved cation lines" and substitute "a scanning means for scanning all of the data communication lines"

Column 16, Line 16- Insert the word "to" after the word "and".

Signed and sealed this 29th day of June 1971.

(SEAL)
Attest:

EDWARD M.FLETCHER,JR.
Attesting Officer

WILLIAM E. SCHUYLER, JR.
Commissioner of Patents